United States Patent
Jeong

(10) Patent No.: US 10,761,912 B2
(45) Date of Patent: Sep. 1, 2020

(54) CONTROLLER INCLUDING MULTI PROCESSOR AND OPERATION METHOD THEREOF

(71) Applicant: SK hynix Inc., Gyeonggi-do (KR)

(72) Inventor: Beom-Rae Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 282 days.

(21) Appl. No.: 15/887,263

(22) Filed: Feb. 2, 2018

(65) Prior Publication Data
US 2018/0307547 A1  Oct. 25, 2018

(30) Foreign Application Priority Data
Apr. 24, 2017 (KR) .................... 10-2017-0052226

(51) Int. Cl.
  G06F 9/54 (2006.01)
  G06F 9/46 (2006.01)
  G06F 3/06 (2006.01)

(52) U.S. Cl.
  CPC ............ G06F 9/546 (2013.01); G06F 3/0619 (2013.01); G06F 3/0659 (2013.01); G06F 3/0679 (2013.01); G06F 9/465 (2013.01)

(58) Field of Classification Search
  None
  See application file for complete search history.

(56) References Cited

U.S. PATENT DOCUMENTS

| | | | |
|---|---|---|---|
| 6,199,127 B1* | 3/2001 | Ajanovic ............ | G06F 13/1605 710/100 |
| 9,503,922 B1* | 11/2016 | Ford ..................... | H04W 28/08 |
| 2006/0136659 A1 | 6/2006 | Jain et al. | |
| 2015/0186068 A1 | 7/2015 | Benisty et al. | |
| 2018/0018133 A1* | 1/2018 | Balakrishnan ........ | G06F 3/0659 |
| 2018/0232178 A1* | 8/2018 | Iwaki .................... | G06F 3/0659 |

\* cited by examiner

*Primary Examiner* — Umut Onat
(74) *Attorney, Agent, or Firm* — IP & T Group LLP

(57) ABSTRACT

A controller may include a first processor suitable for sequentially storing commands provided from a host into one of first and second mailboxes of a memory according to types of the commands; and a second processor suitable for serving the commands stored in the first and second mailboxes, wherein, when provided from the host is a first command corresponding to the same logical address as a second command stored in the second mailbox, the first and second commands being of different types, the first processor stores the first command into the first mailbox and stores into the memory a priority information representing the second command having a higher processing priority to the first command, and wherein the second processor serves the commands stored in the first mailbox and the second mailbox by referring to the priority information.

7 Claims, 12 Drawing Sheets

CONTROLLER INCLUDING MULTI PROCESSOR AND OPERATION METHOD THEREOF

CROSS-REFERENCE TO RELATED APPLICATIONS

The present application claims priority under 35 U.S.C. § 119(a) to Korean Patent Application No. 10-2017-0052226 filed on Apr. 24, 2017, the disclosure of which is incorporated herein by reference in its entirety.

BACKGROUND

1. Field

Various exemplary embodiments of the present invention relate to a multi-processor system. Particularly, exemplary embodiments relate to a controller capable of efficiently managing data, and an operating method thereof.

2. Description of the Related Art

The paradigm of computing environment has changed to ubiquitous computing systems that can be used anytime and anywhere. That is, use of portable electronic devices such as mobile phones, digital cameras, and laptop computers are soaring. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption because they have no moving parts. Examples of memory systems having such advantages include universal serial bus (USB) memory devices, memory cards having various interfaces, and solid state drives (SSD).

A plurality of processors may be employed in a controller for a memory system for improving the overall speed of the controller. The processors may have different roles, and may collaborate to support the entire system by exchanging data with each other through a technique known as inter-processor communication (IPC).

Due to a sudden power off (SPO), the data storage device may be seriously damaged. For example, metadata or cache data must be safely protected in a flash memory based SSD storage devices, but data may be lost due to the SPO. In order to solve such a problem, a method of a sudden power off recovery (SPQR) to recover a data storage device from power-off of a power supply has been studied.

SUMMARY

Various embodiments of the present invention are directed to a controller capable of communicating efficiently between the plurality of core processors.

In accordance with an embodiment of the present invention, a controller may include a first processor suitable for sequentially storing commands provided from a host into one of first and second mailboxes of a memory according to types of the commands; and a second processor suitable for serving the commands stored in the first and second mailboxes, wherein, when provided from the host is a first command corresponding to the same logical address as a second command stored in the second mailbox, the first and second commands being of different types, the first processor stores the first command into the first mailbox and stores into the memory a priority information representing the second command having a higher processing priority to the first command, and wherein the second processor serves the commands stored in the first mailbox and the second mailbox by referring to the priority information.

The second processor may serve the commands stored in the first mailbox and the second mailbox by further referring to a processing order between the first and second mailboxes.

The second processor may serve the commands stored in the second mailbox after completion of service of the commands stored in the first mailbox, and the second processor serves the commands stored in the second mailbox prior to the commands stored in the first mailbox by referring to the priority information.

The first command may be a read command, the second command may be a write command, and the first processor may store a read command into the first mailbox and stores a write command into the second mailbox.

The second processor temporarily may serve the second command prior to service of the first command stored in the first mailbox, and the second processor may serve the second command during service of the commands stored in the second mailbox after the temporary service of the second command.

The second processor may control a memory device to store data corresponding to the second command stored in the second mailbox into a buffer region of the memory device during the temporary service of the second command.

The second processor may control the memory device to store data corresponding to the second command stored in the second mailbox into a storage region of the memory device during the main service of the second command.

The first command may be a write command, the second command may be a read command, and the first processor may store a write command into the first mailbox and stores a read command into the second mailbox.

The second processor temporarily may serve the second command prior to service of the first command stored in the first mailbox, and the second processor may serve the second command during service of the commands stored in the second mailbox after the temporary service of the second command.

In accordance with an embodiment of the present invention, an operating method of a controller including a memory having a plurality of mailboxes, a first processor and a second processor, may include sequentially storing, by the first processor, commands provided from a host into one of first and second mailboxes of a memory according to types of the commands; and serving, by the second processor, the commands stored in the first and second mailboxes, wherein the sequentially storing of the commands includes, when provided from the host is a first command corresponding to the same logical address as a second command stored in the second mailbox, the first and second commands being of different types, storing the first command into the first mailbox and stores into the memory a priority information representing the second command having a higher processing priority to the first command, and wherein the serving of the commands includes serving the commands stored in the first mailbox and the second mailbox by referring to the priority information.

The serving of the commands may include serving the commands stored in the first mailbox and the second mailbox by further referring to a processing order between the first and second mailboxes.

The serving of the commands may include serving the commands stored in the second mailbox after completion of service of the commands stored in the first mailbox; and serving the commands stored in the second mailbox prior to the commands stored in the first mailbox be referring to the priority information.

The first command may be a read command, the second command may be a write command, and the sequentially storing of the commands may include storing a read command into the first mailbox and stores a write command into the second mailbox.

The serving of the commands may include serving the second command prior to service of the first command stored in the first mailbox; and serving the second command during service of the commands stored in the second mailbox after the temporary service of the second command.

The temporarily serving of the second command may include controlling a memory device to store data corresponding to the second command stored in the second mailbox into a buffer region of the memory device.

The serving of the second command may include controlling the memory device to store data corresponding to the second command stored in the second mailbox into a storage region of the memory device.

The first command may be a write command, the second command may be a read command, and the sequentially storing of the commands may include storing a write command into the first mailbox and stores a read command into the second mailbox.

The serving of the commands may include temporarily serving the second command prior to service of the first command stored in the first mailbox; and serving the second command during service of the commands stored in the second mailbox after the temporary service of the second command.

In accordance with an embodiment of the present invention, a memory system may include a memory device; and a controller suitable for rearranging a sequence of commands provided from a host, and controlling the memory device to perform operations in response to the rearranged sequence of command, wherein the controller rearranges the sequence of commands by rearranging a sequence of commands corresponding to different addresses according to a priority order of the commands, and wherein the controller rearranges the sequence of commands by rearranging a sequence of commands corresponding to the same address according to a response sequence to the host.

DETAILED DESCRIPTION

Figure 1:
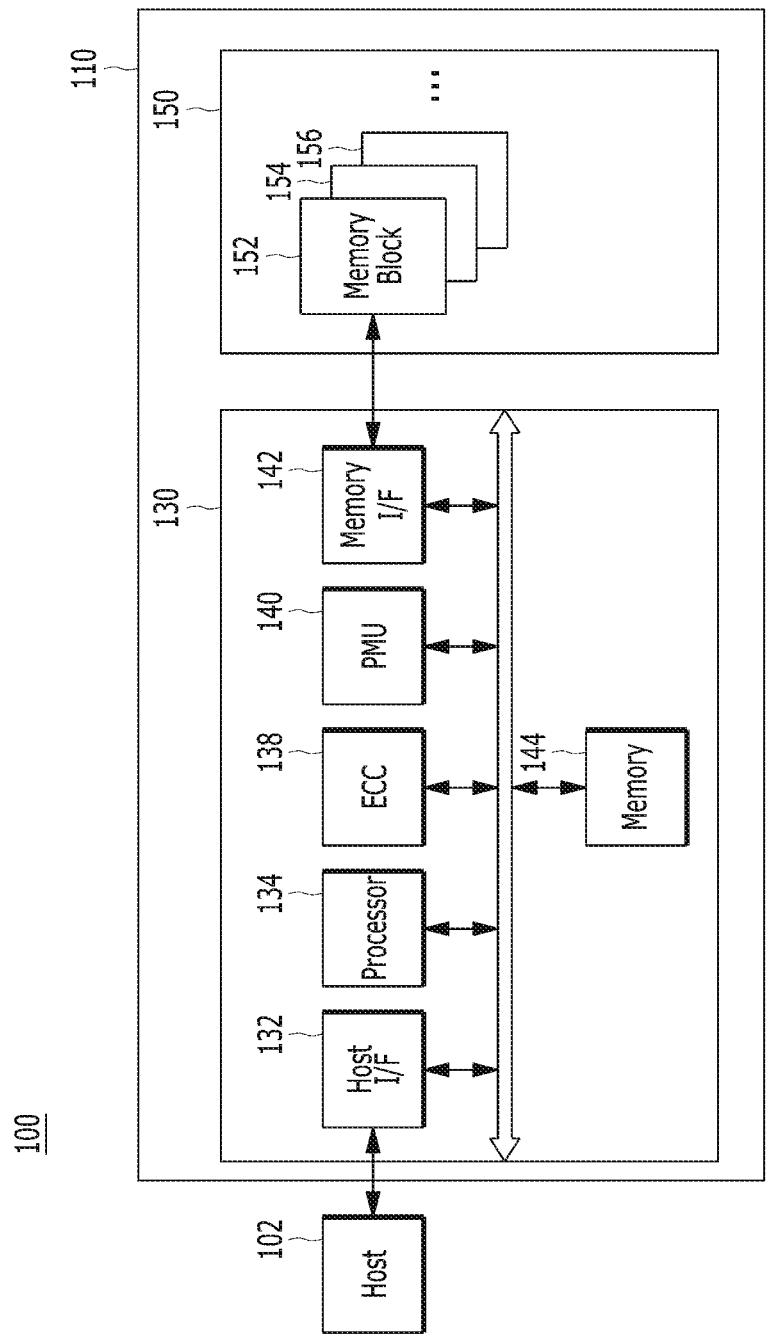
FIG. 1 is a block diagram illustrating a data processing system including a memory system, in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may be, for example, a portable electronic device such as a mobile phone, an MP3 player, and a laptop computer or an electronic device such as a desktop computer, a game player, a TV, a projector, and the like.

The memory system 110 may operate in response to a request from the host 102, and in particular, store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static RAM (SRAM), and nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM), and a flash memory.

The memory system 110 may include a memory device 150 which stores data to be accessed by the host 102, and a controller 130 which may control storage of data in the memory device 150.

The controller 130 and the memory device 150 may be integrated into a single semiconductor device, which may be included in the various types of memory systems as exemplified above.

The memory system 110 may be configured as part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152 to 156, and each of the memory blocks 152 to 156 may include a plurality of pages. Each of the pages may include a plurality of memory cells to which a plurality of word lines (WL) are electrically coupled.

The controller 130 may control overall operations of the memory device 150, such as read, write, program, and erase operations. For example, the controller 130 of the memory system 110 may control the memory device 150 in response to a request from the host 102. The controller 130 may provide the data read from the memory device 150 to the host 102, and/or may store the data provided from the host 102 into the memory device 150.

The controller 130 may include a host interface (I/F) unit 132, a processor 134, an error correction code (ECC) unit 138, a power management unit (PMU) 140, a memory interface (I/F) unit 142 such as a NAND flash controller (NFC), and a memory 144 all operatively coupled via an internal bus.

The host interface unit 132 may process commands and data provided from the host 102, and may communicate with the host 102 through at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDDC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, modules, systems or devices for the error correction operation.

The PMU 140 may provide and manage power of the controller 130.

The memory interface unit 142 may serve as a memory/storage interface between the controller 130 and the memory device 150 to allow the controller 130 to control the memory device 150 in response to a request from the host 102. The memory interface unit 142 may generate a control signal for the memory device 150 and process data to be provided to the memory device 150 under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. The controller 130 may provide data read from the memory device 150 to the host 102, and/or may store data provided from the host 102 into the memory device 150. The memory 144 may store data required for the controller 130 and the memory device 150 to perform these operations.

Figure 5:
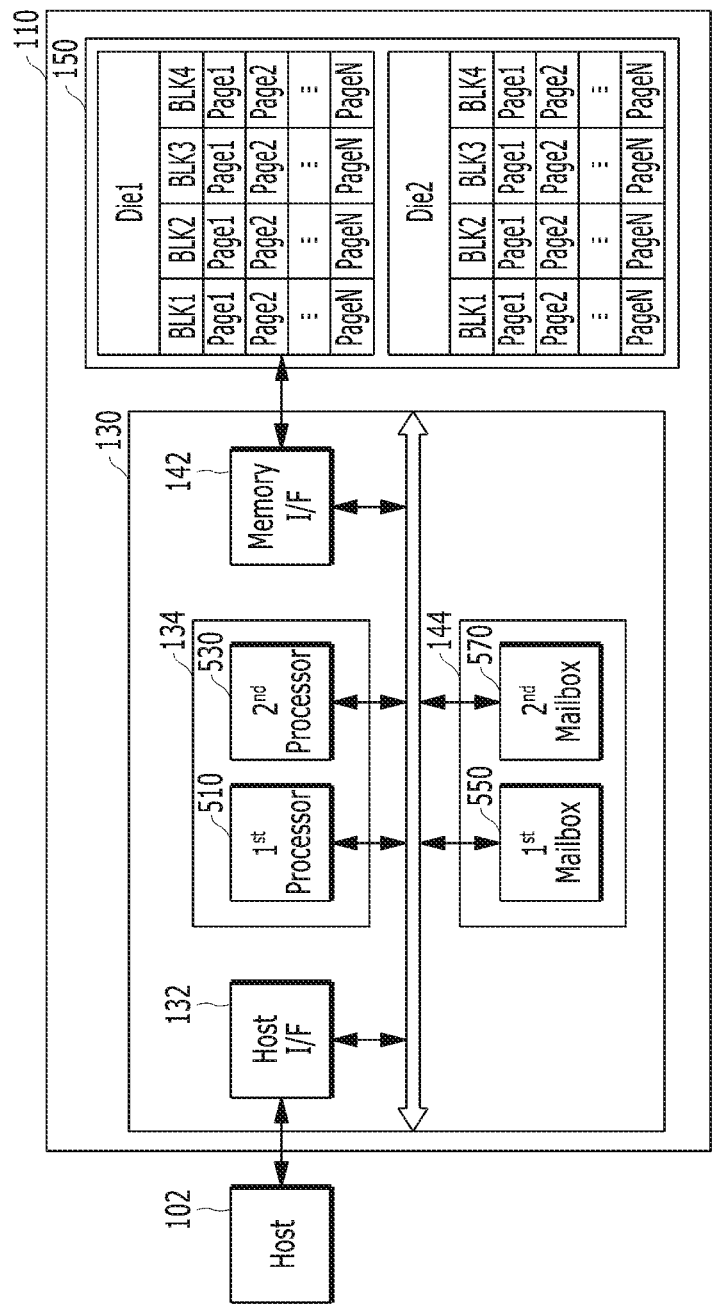
FIG. 5 is a diagram illustrating a controller and a memory in accordance with an embodiment of the present invention.

The memory 144 may include a mailbox for storing data for communication between a plurality of processors (See FIG. 5).

The memory 144 may be implemented with a volatile memory. The memory 144 may be implemented with a static random access memory (SRAM) or a dynamic random access memory (DRAM). Although FIG. 1 exemplifies the memory 144 disposed within the controller 130, the present disclosure is not limited thereto. That is, the memory 144 may be disposed within or out of the controller 130. For instance, in an embodiment, the memory 144 may be embodied by an external volatile memory having a memory interface transferring data between the memory 144 and the controller 130.

The processor 134 may control the overall operations of the memory system 110. The processor 134 may drive firmware, which is referred to as a flash translation layer (FTL), to control the general operations of the memory system 110.

The FTL may perform an operation as an interface between the host 102 and the memory device 150. The host 102 may request to the memory device 150 write and read operations through the FTL.

The FTL may manage operations of address mapping, garbage collection, wear-leveling and so forth. Particularly, the FTL may store map data. Therefore, the controller 130 may map a logical address, which is provided from the host 102, to a physical address of the memory device 150 through the map data. The memory device 150 may perform an operation like a general device because of the address mapping operation. Also, through the address mapping operation based on the map data, when the controller 130 updates data of a particular page, the controller 130 may program new data into another empty page and may invalidate old data of the particular page due to a characteristic of a flash memory device. Further, the controller 130 may store map data of the new data into the FTL.

Further, the FTL may re-build the map data during a sudden power off recovery (SPOR) operation. The SPOR operation may be performed during a booting operation at least after an abnormal power off. In accordance with an embodiment of the present invention, an operating method of a memory system may re-build a map data during a booting after an abnormal power off.

The processor 134 may be implemented with a microprocessor or a central processing unit (CPU). The memory system 110 may include one or more processors 134.

A management unit (not shown) may also be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory such as a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
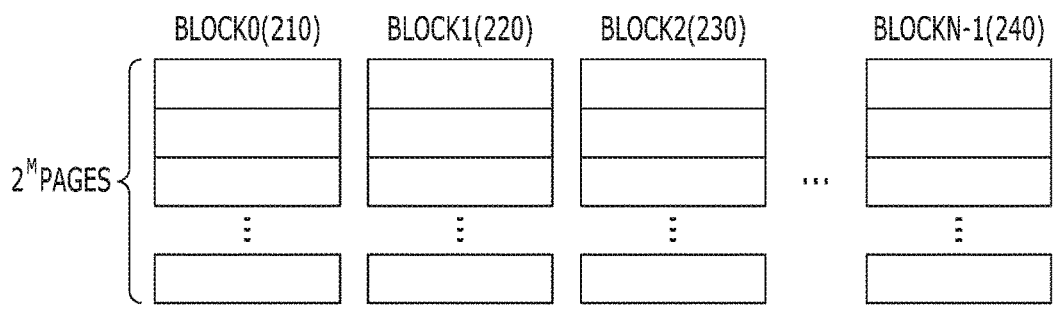
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include the plurality of memory blocks BLOCK 0 to BLOCKN−1, and each of the blocks BLOCK 0 to BLOCKN−1 may include a plurality of pages, for example, $2^M$ pages, the number of which may vary according to circuit design. The memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the plurality of memory blocks 210 to 240 may store the data provided from the host device 102 during a write operation, and may provide stored data to the host 102 during a read operation.

Figure 3:
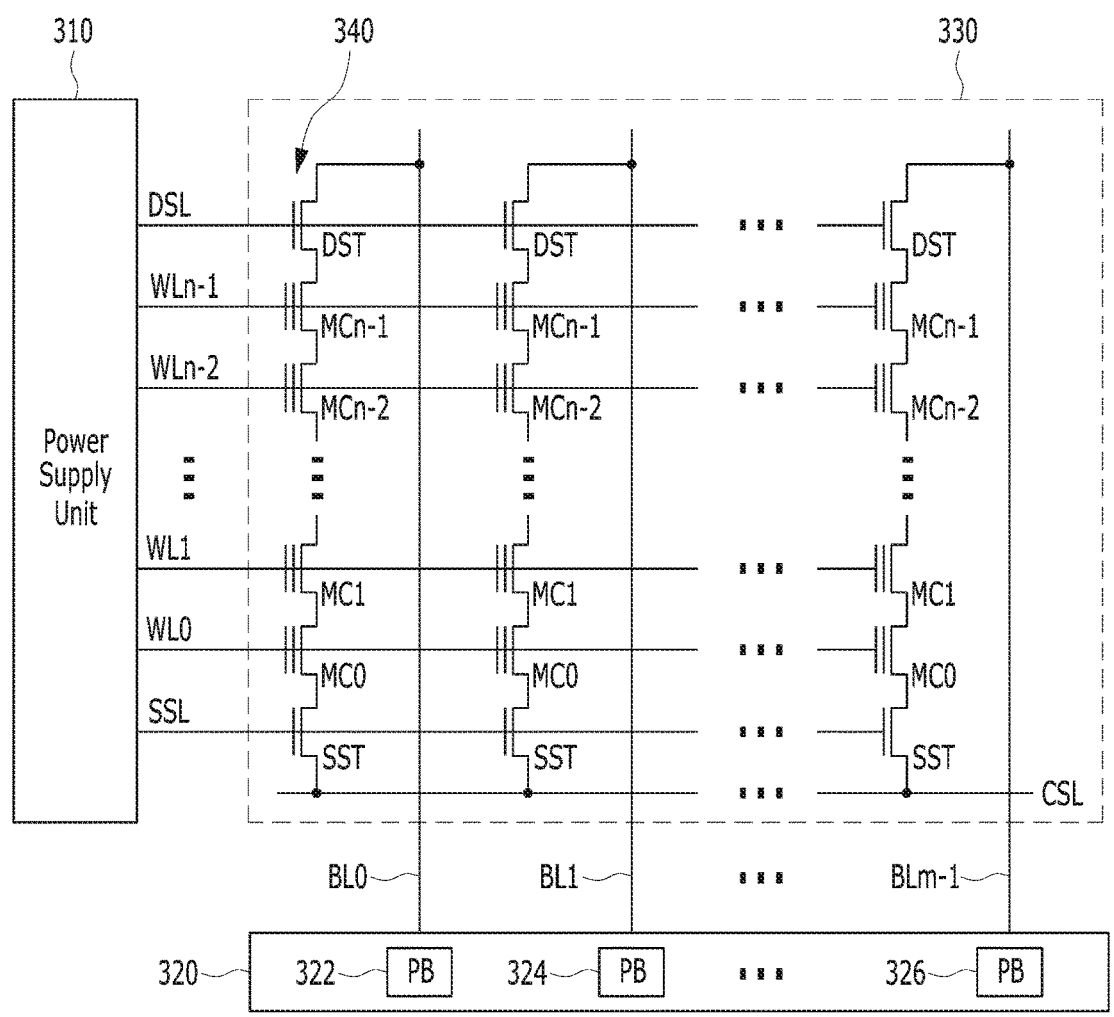
FIG. 3 is a circuit diagram illustrating an exemplary configuration of a memory cell array of a memory block in the memory device shown in FIG. 2.

FIG. 3 is a circuit diagram illustrating a memory block 330 in the memory device 150.

Referring to FIG. 3, the memory block 330 which corresponds to any of the plurality of memory blocks 152 to 156.

Referring to FIG. 3, the memory block 152 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by single level cells (SLC) each of which may store 1 bit of information, or by multi-level cells (MLC) each of which may store data information of a plurality of bits. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 only shows, as an example, the memory block 152 which is configured by NAND flash memory cells, it is to be noted that the memory block 152 of the memory device 150 according to the embodiment is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A power supply unit 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The power supply unit 310 may perform a voltage generating operation under the control of a control circuit (not shown). The power supply unit 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
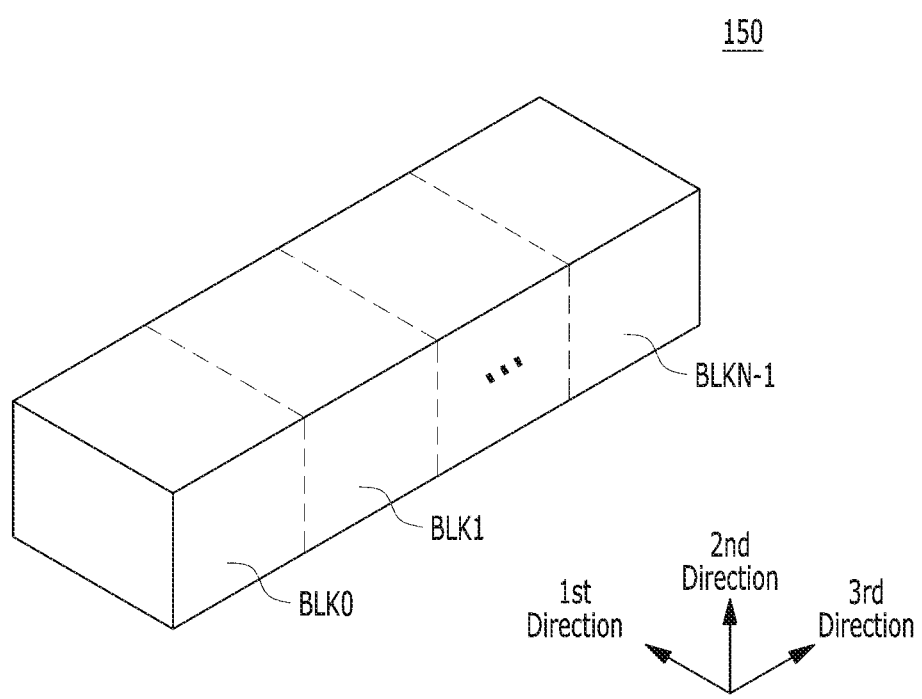
FIG. 4 is a schematic diagram illustrating an exemplary three-dimensional (3D) structure of the memory device shown in FIG. 2.

FIG. 4 is a schematic diagram illustrating a three-dimensional (3D) structure of the memory device 150.

The memory device 150 may be embodied by a two-dimensional (2D) or three-dimensional (3D) memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

FIG. 5 is a diagram illustrating the controller 130 including a plurality of processors 134 and the memory 144 including a plurality of mailboxes in accordance with an embodiment of the present invention.

FIG. 5 exemplifies a first processor 510 and a second processor 530 included in the plurality of processors 134. For example, the first processor 510 may serve as a host interface and the second processor 520 may serve as a NAND interface.

The first processor 510 may store a command, which is provided from the host 102 through the host interface 132, into the mailboxes 550 and 570 of the memory 144 according to a type of the command. Also, the second processor 530 may control the memory interface unit 142 to sequentially serve the commands, which are stored in the mailboxes 550 and 570 in a predetermined processing order between the mailboxes 550 and 570, on the memory device 150. Through this process, the plurality of processors 134 may perform respective tasks, and may share information for processing tasks. The mailboxes 550 and 570 may temporarily store data for communication among the plurality of processors 134.

The first processor 510 may store a command into the mailboxes 550 and 570 according to a type of the provided command. For example, the first processor 510 may store a read command provided from the host 102 into the first mailbox 550, and may store a write command provided from the host 102 into the second mailbox 570. The command may include a foreground command and a background command. The foreground command may include read and write commands provided from the host 102, and the background command may include a garbage collection command, a flush command, and a read reclaim command provided from the host 102 and/or the controller 130.

The second processor 530 may serve commands stored in the mailboxes 550 and 570 according to a predetermined processing order. For example, when the first mailbox 550 has priority over the second mailbox 570 in the processing order, the second processor 530 may serve commands stored in the second mailbox 570 after completing service of commands stored in the first mailbox 550.

However, when the second processor 530 serves commands stored in the mailboxes 550 and 570 according to a predetermined processing order without flexibility, service results may be erroneous. For example, when the host 102 provides a write command to store data "B" into a memory space of a logical address "10" currently storing data "A" and then provides a read command to read data stored in the memory space of the same logical address, the first processor 510 may store the read command into the first mailbox 550 and may store the write command into the second mailbox 570. Accordingly, when the second processor 530 serves the read command stored in the first mailbox 550 first and then serves the write command stored in the second mailbox 570 according to the processing order, the host 102 supposed to be provided with the data "B" according to an order of transmission from the host 102 (i.e., the sequence of the write command and then the read command) may be erroneously provided with the data "A". That is, when read and write commands for the same logical address are sequentially provided from the host 102 and then stored into the mailboxes 550 and 570, the second processor 530 may serve the read and write commands stored in the mailboxes 550 and 570 strictly according to the processing order and thus the service result may be erroneous.

In order to prevent the above-described problem, commands may be served according to the order of transmission from the host 102, which causes increase of serving time for a read command.

Hereinafter, it is assumed, for convenience of description, that command sequence provided from the host 102 includes read commands and write commands and the first mailbox 550 has a priority to the second mailbox 570 in the processing order, which is mere an example, and types of commands and the priority may vary according to system design.

Figure 6:
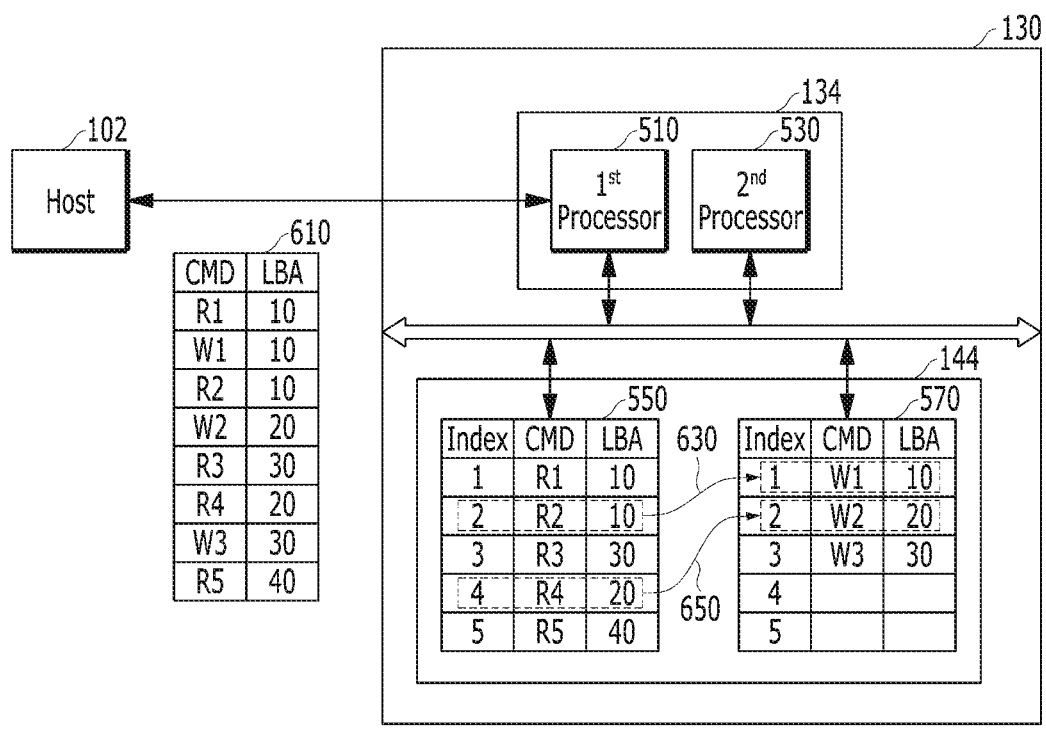
FIG. 6 is a diagram illustrating a communication method between plurality of processors through plurality of mailboxes in accordance with an embodiment of the present invention.

FIG. 6 is a diagram illustrating an operation of the first processor 510 storing commands, which are provided from the host 102, into the mailboxes 550 and 570.

Referring to FIG. 6, each of the mailboxes 550 and 570 may include an index field INDEX, a command field CMD, and a logical address field LBA. The index field INDEX may represent an order of commands stored in the mailboxes 550 and 570. The command field CMD may represent types of the commands stored in the mailboxes 550 and 570. The logical address field LBA may represent logical locations corresponding to the commands of the command field CMD in the memory device 150.

When the host 102 provides a command sequence 610 to the first processor 510, the first processor 510 may sequentially store commands included in the command sequence 610 into the mailboxes 550 and 570 according to types of the commands.

As exemplified in FIG. 6, when the command sequence 610 including first to fifth read commands R1 to R5 and first to third write commands W1 to W3 are provided to the first processor 510, the first processor 510 may sequentially store the first to fifth read commands R1 to R5 into the first mailbox 550 and may sequentially store the first to third write commands W1 to W3 into the second mailbox 570.

When the first processor 510 sequentially stores commands of the command sequence 610 into the mailboxes 550 and 570 according to types of the commands, the first processor 510 may store priority information of commands corresponding to the same logical address into the memory 144.

For example, when a write command and a read command correspond to the same logical address and the write command is supposed to be served earlier than the read command, the first processor 510 may store the priority information representing the write command currently stored in the second mailbox 570 of a lower priority but having a higher priority to the read command currently stored in the first mailbox 550 of a higher priority.

In a similar way, for example, when the second mailbox 570 has a higher priority to the first mailbox 550 and a write command and a read command correspond to the same logical address while the read command is supposed to be served earlier than the write command, the first processor 510 may store the priority information representing the read command currently stored in the first mailbox 550 but having a higher priority to the write command currently stored in the second mailbox 570.

The priority information may represent a command having a higher priority to a command corresponding to the same logical address. For example, the host 102 may provide a command of a higher priority earlier than a command of a lower priority. That is, the priority of a command may represent a sequence order of response to the command supposed to be provided to the host 102. In an embodiment, the first processor 510 may manage commands corresponding to the same logical address through a linked list and the priority information may be implemented with a pointer representing a command having a higher priority to remaining commands corresponding to the same logical address.

As exemplified in FIG. 6, when the first mailbox 550 has a higher priority to the second mailbox 570, the first processor 510 may sequentially store the first read command R1 and the first write command W1 both corresponding to the logical address having a value of 10 (i.e., LBA 10) into the first mailbox 550 and the second mailbox 570, respectively. Then, the first processor 510 may store the second read command R2 also corresponding to the same logical address (i.e., LBA 10) into the first mailbox 550 and at the same time may store into the memory 144 the priority information 630 representing the first write command W1 having a higher priority to the second read command R2.

Further, the first processor 510 may sequentially store the second write command W2 corresponding to a logical address having a value of 20 (i.e., LBA 20), the third read command R3 corresponding to a logical address having a value of 30 (i.e., LBA 30), the fourth read command R4 also corresponding to the logical address having a value of 20 (i.e., LBA 20) and the third write command W3 also corresponding to a logical address having a value of 30 (i.e., LBA 30) into one among the first mailbox 550 and the second mailbox 570 correspondingly. At the same time, the first processor 510 may store into the memory 144 the priority information 650 representing the second write command W2 having a higher priority to the fourth read command R4.

Figure 7:
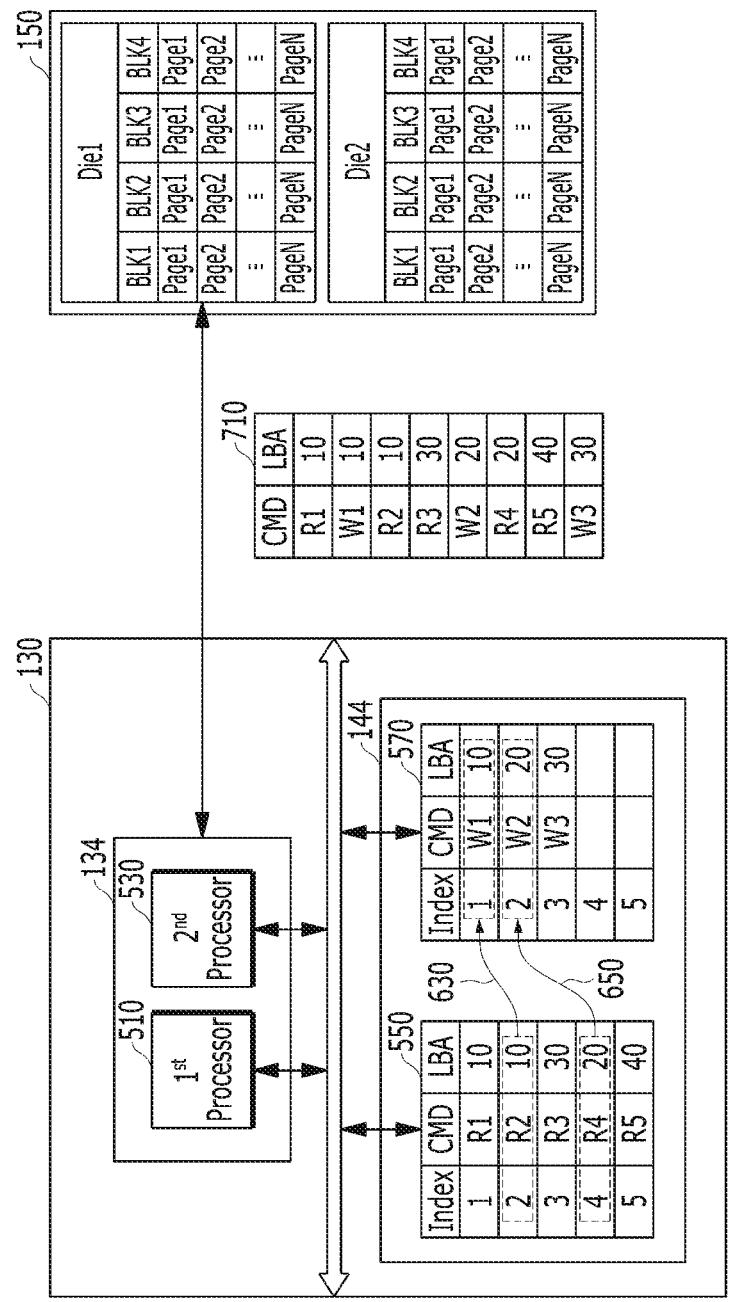
FIG. 7 is a diagram illustrating a communication method between plurality of processors through plurality of mailboxes in accordance with an embodiment of the present invention.

FIG. 7 is a diagram illustrating an operation of the second processor 530 serving commands stored in the mailboxes 550 and 570 in accordance with an embodiment of the present invention.

The second processor 530 may sequentially serve the first to fifth read commands R1 to R5 and the first to third write commands W1 to W3 stored in the mailboxes 550 and 570, respectively, according to the predetermined processing order between the mailboxes 550 and 570. When the first mailbox 550 has a higher priority to the second mailbox 570, the second processor 530 may serve the first to third write commands W1 to W3 stored in the second mailbox 570 after completion of service of the first to fifth read commands R1 to R5 stored in the first mailbox 550.

Further, when the second processor 530 serves the first to fifth read commands R1 to R5 and the first to third write commands W1 to W3 stored in the mailboxes 550 and 570, respectively, according to the predetermined processing order, the second processor 530 may refer to the priority information 630 and 650 stored in the memory 144. By referring to the priority information 630 representing the first write command W1 having a higher priority to the second read command R2, the second processor 530 may serve the second read command R2 after completion of service of the first write command W1. In a similar war, by referring to the priority information 650 representing the second write command W2 having a higher priority to the fourth read command R4, the second processor 530 may serve the fourth read command R4 after completion of service of the second write command W2.

Therefore, a command sequence 710 that the second processor 530 provides to the memory device 150 may be different from the command sequence 610 provided from the host 102. As exemplified in FIG. 7, the second processor 530 may serve the third read command R3, which is provided in fifth place in the command sequence 610 from the host 102, prior to the second write command W2, which is provided in fourth place in the command sequence 610 from the host 102. Further, the second processor 530 may serve the second write command W2, which is provided in fourth place in the command sequence 610 from the host 102, prior to the fourth read command R4, which is provided in sixth place in the command sequence 610 from the host 102.

Figure 8:
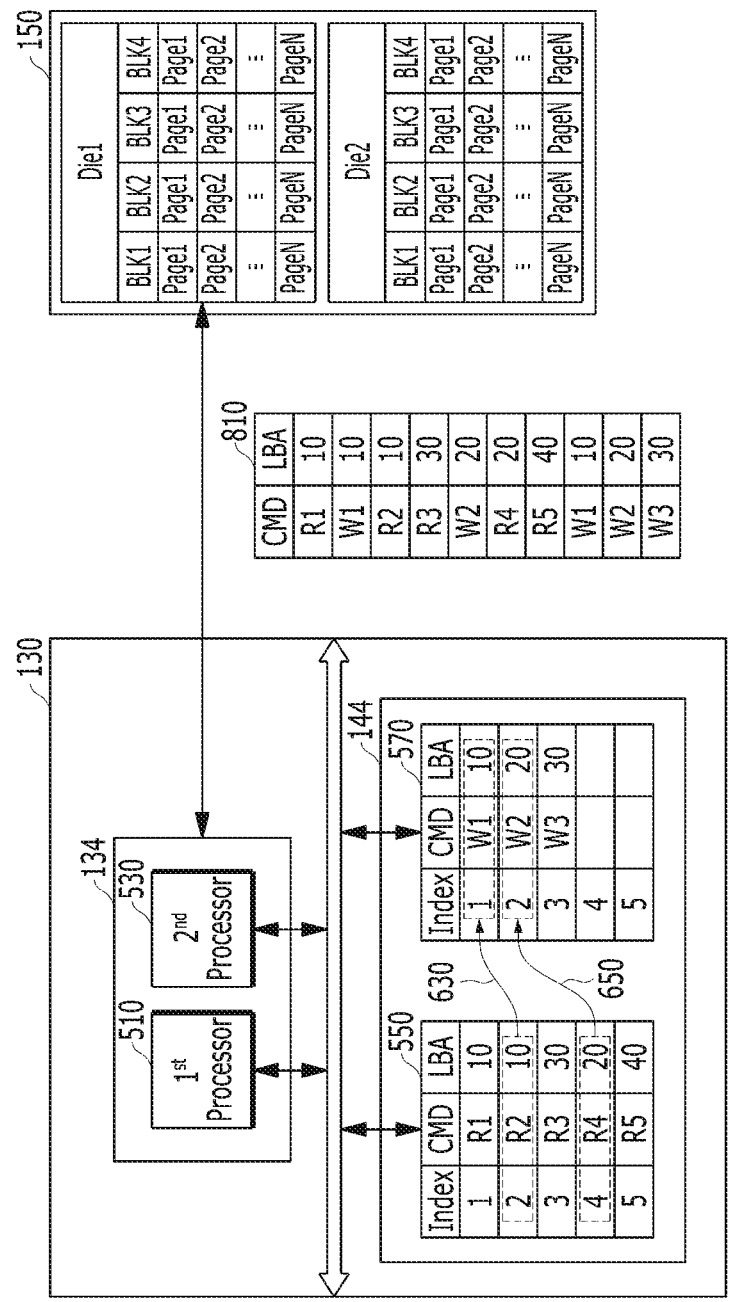
FIG. 8 is a diagram illustrating a communication method between plurality of processors through plurality of mailboxes in accordance with an embodiment of the present invention.

FIG. 8 is a diagram illustrating an operation of the second processor 530 serving commands stored in the mailboxes 550 and 570 in accordance with an embodiment of the present invention.

The second processor 530 may temporarily serve the write commands W1 and W2 represented by the priority information 630, and then may sequentially serve the write commands stored in the second mailbox 570.

For example, by referring to the priority information 630, the second processor 530 may temporarily serve the first write command W1 and then may serve the second read command R2. When the service of the read commands stored in the first mailbox 550 is completed, the second processor 530 may serve the first write command W1 stored in the second mailbox 570. In the similar way, by referring to the priority information 650, the second processor 530 may temporarily serve the second write command W2 and then may serve the fourth read command R4. When the service of the read commands stored in the first mailbox 550 is completed, the second processor 530 may serve the second write command W2 stored in the second mailbox 570.

During the temporary service, the second processor 530 may control the memory device 150 to store data corresponding to the write commands W1 and W2 of the priority information 630 and 650 into a buffer region (e.g., a second die DIE2) of the memory device 150. During the main service, the second processor 530 may control the memory device 150 to store data corresponding to the write commands W1 and W2 of the priority information 630 and 650 into an intended storage region (e.g., a first die DIE1) of the memory device 150. The temporarily stored data of the buffer region (e.g., the second die DIE2) through the temporary service may be deleted or invalidated after the data corresponding to the write commands W1 and W2 of the priority information 630 and 650 are stored into the intended storage region (e.g., the first die DIE1) of the memory device 150 through the main service.

In accordance with an embodiment of the present invention, the memory system 110 may reduce latency for a read command by serving commands stored in the mailboxes 550 and 570 according to the predetermined processing order between the mailboxes 550 and 570.

Further, in accordance with an embodiment of the present invention, the memory system 110 may prevent erroneous output sequence of data to the host 102 in response to a read command by serving commands to the memory device 150 according to the priority information 630 and 650 of the commands.

Still further, in accordance with an embodiment of the present invention, the memory system 110 may prevent increase of response time to a read command by serving commands according to the priority relationship between a read command and a write command for the same logical address.

FIGS. 9 to 17 are diagrams schematically illustrating application examples of the data processing system of FIGS. 1 to 8 according to various embodiments.

Figure 9:
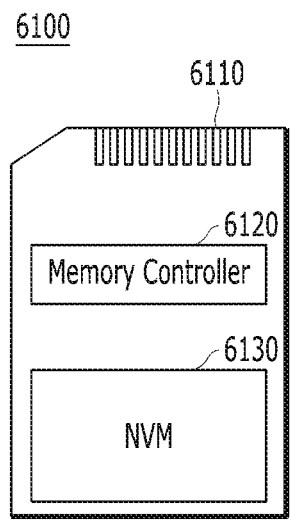
FIGS. 9 to 17 are diagrams schematically illustrating application examples of a data processing system, in accordance with various embodiments of the present invention.

FIG. 9 is a diagram schematically illustrating an example of the data processing system including the memory system in accordance with the present embodiment. FIG. 9 schematically illustrates a memory card system to which the memory system in accordance with the present embodiment is applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 to 8, and the memory device 6130 may correspond to the memory device 150 of the memory system 110 described with reference to FIGS. 1 to 8.

Thus, the memory controller 6120 may include a RAM, a processing unit, a host interface, a memory interface and an error correction unit. The memory controller 130 may further include the elements described in FIG. 1.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
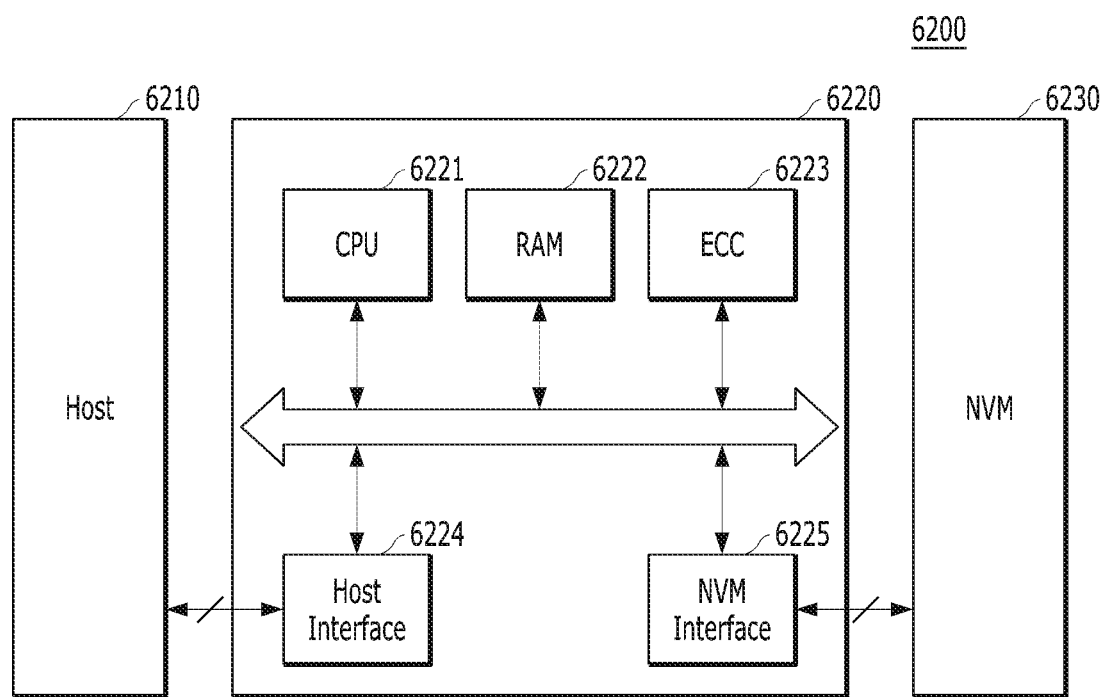

FIG. 10 is a diagram schematically illustrating another example of the data processing system including a memory system, in accordance with the present embodiment.

Referring to FIG. 10, the data processing system 6200 may include a memory device 6230 having one or more nonvolatile memories and a memory controller 6220 for controlling the memory device 6230. The data processing system 6200 illustrated in FIG. 9 may serve as a storage medium such as a memory card (CF, SD, micro-SD or the like) or USB device, as described with reference to FIG. 1. The memory device 6230 may correspond to the memory device 150 in the memory system 110 described in FIGS. 1 to 8, and the memory controller 6220 may correspond to the controller 130 in the memory system 110 described in FIGS. 1 to 8.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control the operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 11:
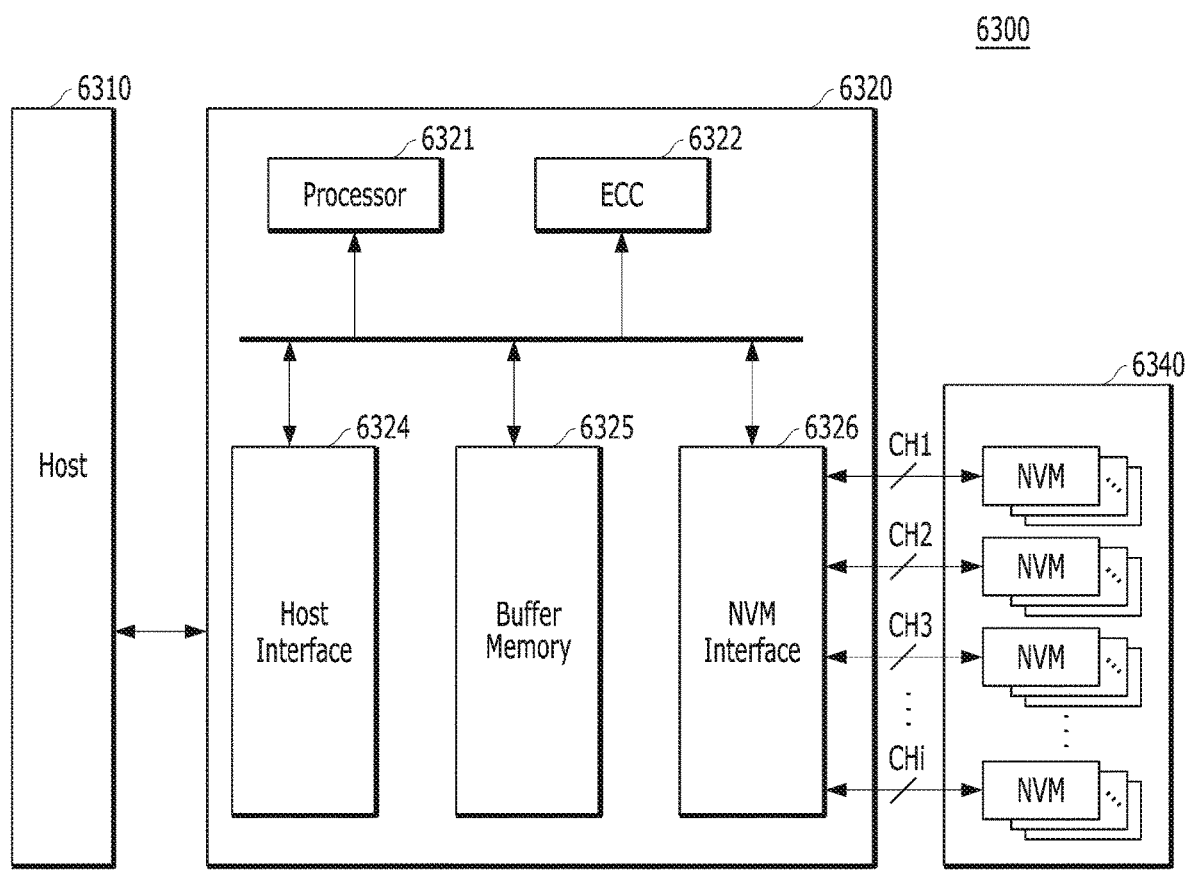

FIG. 11 is a diagram schematically illustrating another example of the data processing system including the memory system in accordance with the present embodiment. FIG. 11 schematically illustrates an SSD to which the memory system in accordance with the present embodiment is applied.

Referring to FIG. 11, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta-data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 11 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
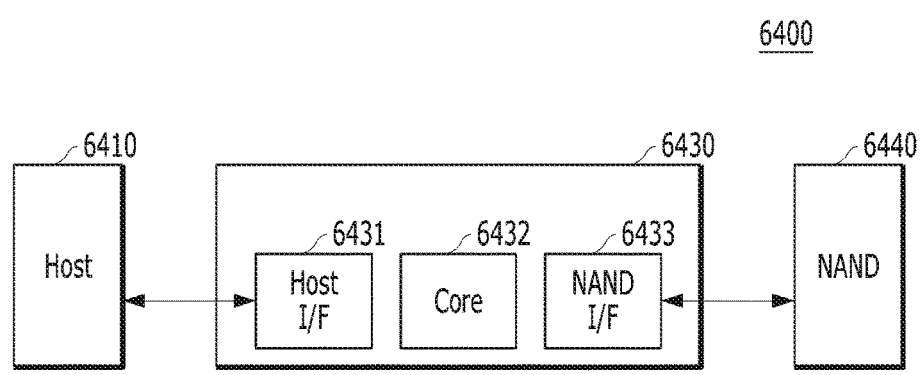

FIG. 12 is a diagram schematically illustrating another example of the data processing system including the memory system in accordance with an embodiment. FIG. 12 schematically illustrates an embedded Multi-Media Card (eMMC) to which the memory system in accordance with an embodiment is applied.

Referring to FIG. 12, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels.

The controller 6430 may include one or more cores 6432, a host interface 6431 and a memory interface, for example, a NAND interface 6433.

The core 6432 may control the operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with an embodiment. FIGS. 13 to 16 schematically illustrate UFS (Universal Flash Storage) systems to which the memory system in accordance with an embodiment is applied.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 9 to 11, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 13:
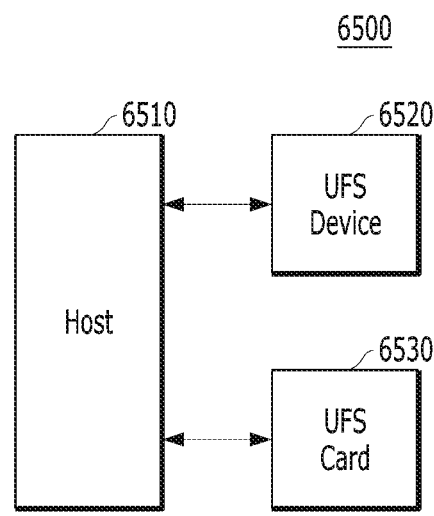

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 14:
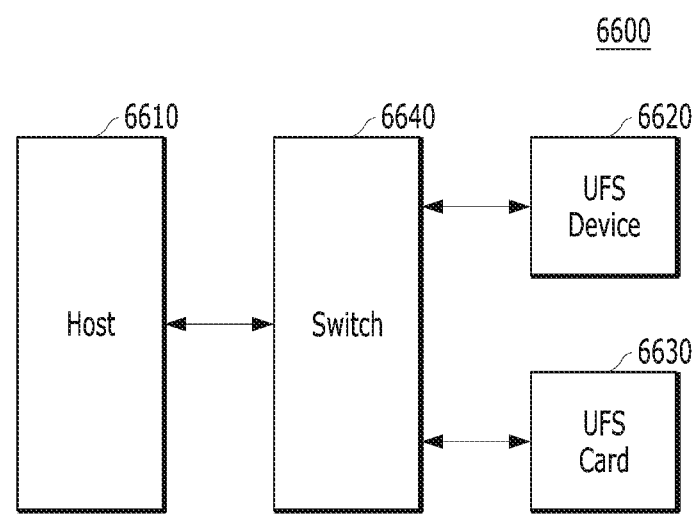

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 15:
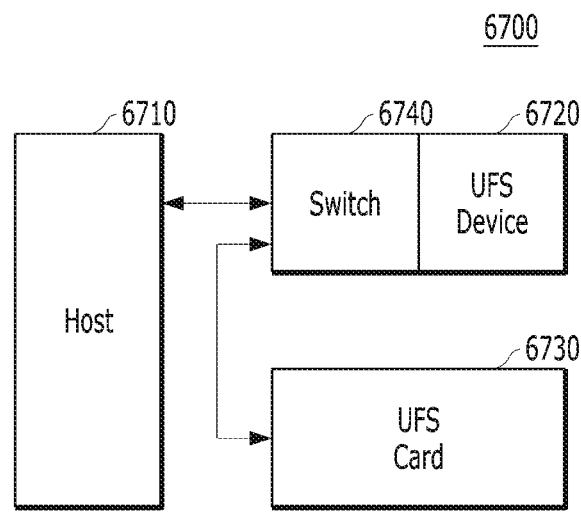

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
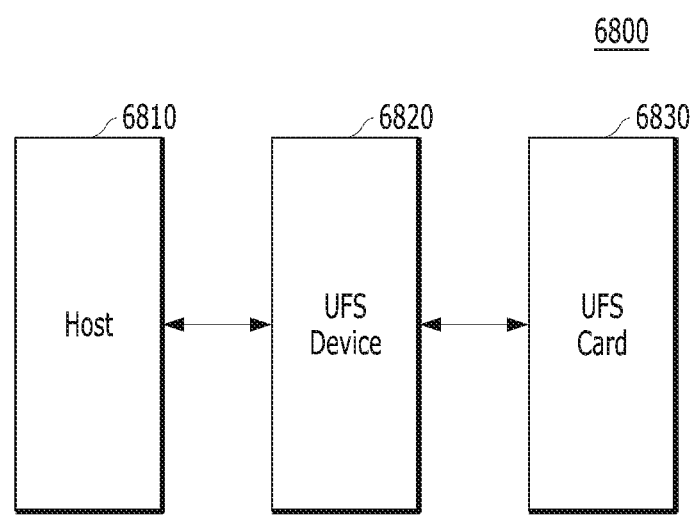

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
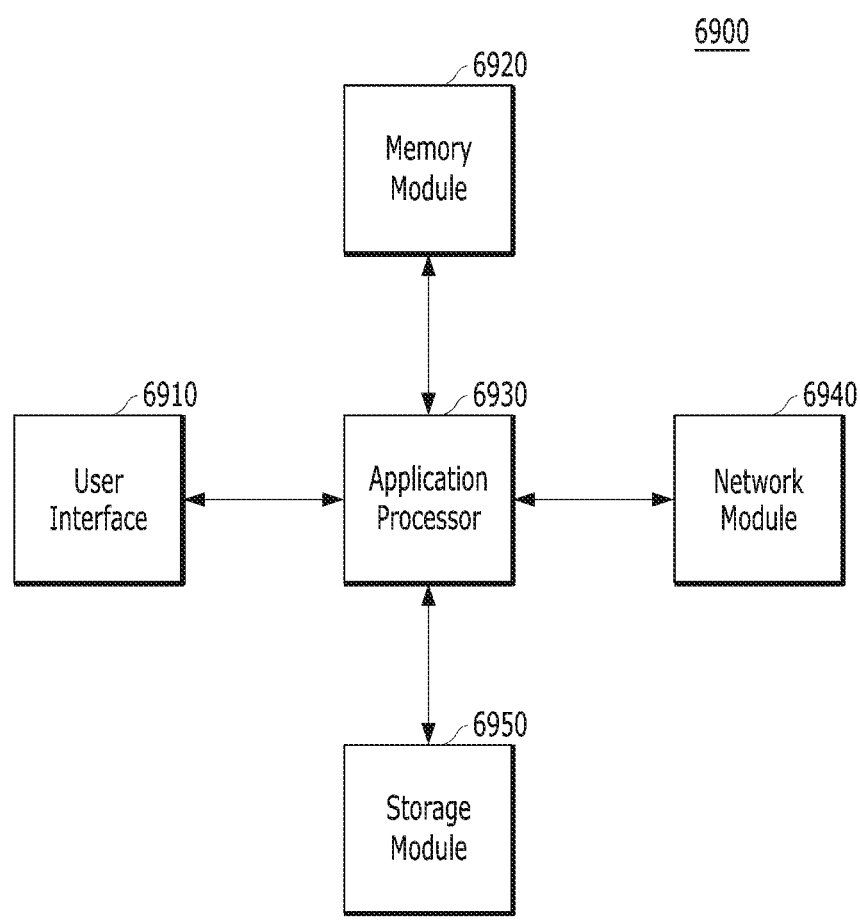

FIG. 17 is a diagram schematically illustrating another example of the data processing system including the memory system in accordance with an embodiment. FIG. 17 is a diagram schematically illustrating a user system to which the memory system in accordance with an embodiment is applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 9 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control the operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the present invention has been described with respect to specific embodiments, it will be apparent to those skilled in the art that various changes and modifications may be made without departing from the spirit and scope of the invention as defined in the following claims.

What is claimed is:

1. A controller comprising:
   a memory including a first mailbox suitable for storing a read command, and a second mailbox, having a lower mailbox priority than the first mailbox, suitable for storing a write command;
   a first processor suitable for sequentially storing commands provided from a host into one of the first and second mailboxes according to types of the commands; and
   a second processor suitable for serving the commands stored in the first and second mailboxes,
   wherein, when provided from the host is a first read command corresponding to the same logical address as a second write command stored in the second mailbox, the first processor stores the first read command into the first mailbox and stores into the memory a command priority information representing the second write command having a higher command priority than the first read command, and
   wherein the second processor serves the commands stored in the first mailbox and the second mailbox by referring to the mailbox priority and the command priority overriding the mailbox priority.

2. The controller of claim 1,
   wherein the second processor serves the commands stored in the second mailbox after completion of service of the commands stored in the first mailbox, and
   wherein the second processor serves the commands stored in the second mailbox prior to the commands stored in the first mailbox by referring to the command priority information.

3. The controller of claim 2,
   wherein the second processor temporarily serves the second command, by storing data corresponding to the second command into a buffer region of the memory device, prior to service of the first command stored in the first mailbox, and
   wherein the second processor serves the second command, by storing the data corresponding to the second command into a storage region of the memory device, during service of the commands stored in the second mailbox after the temporary service of the second command.

4. An operating method of a controller including a memory having a first mailbox and a second mailbox having a lower mailbox priority than the first mailbox, a first processor and a second processor, the method comprising:

sequentially storing, by the first processor, commands provided from a host into one of the first and second mailboxes according to types of the commands; and serving, by the second processor, the commands stored in the first and second mailboxes, wherein the first mailbox is suitable for storing a read command and the second mailbox is suitable for storing a write command, wherein the sequentially storing of the commands includes, when provided from the host is a first read command corresponding to the same logical address as a second write command stored in the second mailbox, storing the first read command into the first mailbox and storing into the memory a command priority information representing the second write command having a higher command priority than the first read command, and wherein the serving of the commands includes serving the commands stored in the first mailbox and the second mailbox by referring to the mailbox and the command priority overriding the mailbox priority.

5. The method of claim 4, wherein the serving of the commands includes:

serving the commands stored in the second mailbox after completion of service of the commands stored in the first mailbox; and serving the commands stored in the second mailbox prior to the commands stored in the first mailbox by referring to the command priority information.

6. The method of claim 5, wherein the serving of the commands includes:

temporarily serving the second command, by storing data corresponding to the second command into a buffer region of the memory device, prior to service of the first command stored in the first mailbox; and serving the second command, by storing the data corresponding to the second command into a storage region of the memory device, during service of the commands stored in the second mailbox after the temporary service of the second command.

7. A memory system comprising:

a memory device; and a controller including a first mailbox and a second mailbox having a lower priority than the first mailbox, the first mailbox suitable for storing a read command and a second mailbox suitable for storing a write command, and the controller is suitable for:

storing commands provided from a host into the first or second mailbox according to a type of each command, determining a sequence of the commands according to the priority of the mailbox to which each command belongs, rearranging the sequence of the commands by rearranging a sequence of commands corresponding to the same logical address according to a response sequence to the host, and wherein the sequence of the commands corresponding to the same logical address includes a first read command and a second write command, and the rearranging comprises storing the first read command into the first mailbox and storing a command priority information representing the second write command having a higher command priority than the first read command, controlling the memory device to perform an operation in response to the rearranged sequence of the commands by referring to the mailbox priority and the command priority overwriting the mailbox priority.

\* \* \* \* \*